United States Patent [19]

Kiss et al.

[11] Patent Number: 4,772,307
[45] Date of Patent: Sep. 20, 1988

[54] PROCESS FOR PREPARING AN AGRICULTURAL FERTILIZER FROM SEWAGE

[76] Inventors: Jenó Kiss, 27, Kórház u., H-1035 Budapest; Ádám Hosszu, 2, Zöldlomb u., H-1025 Budapest; Bála Deák, 4, Guttenberg tér, H-1088 Budapest; Dénes Kalló, 2-4, Frankel L.u., H-1027 Budapest; János Papp, 2, Fillér lépcsó, H-1022 Budapest; Ágnes Mészáros née Kis, 9/b, Thomán István u., H-1124 Budapest; Mucsy, György, 8, Martinovics tér, H-1105 Budapest; József Oláh, 46, Eperjes u., H-1204 Budapest; György Urbányi, 90, Furórózsa u., H-1165 Budapest; Tivadar Gál, 41, Kassai u., H-5000 Szolnok; István Apró, 19, Csokonai u., H-5000 Szolnok; Czepek, Gyula, 17, Jószi F. u., H-5000 Szolnok; Ferenc Törócsik, 18, Ady Endre u., H-5000 Szolnok; András Lovas, 4, Ragó A. u., H-5000 Szolnok, all of Hungary

[21] Appl. No.: 89,007

[22] Filed: Aug. 20, 1987

Related U.S. Application Data

[63] Continuation of Ser. No. 800,564, Nov. 20, 1985, abandoned, which is a continuation of PCT HU85/00021, filed Apr. 1, 1985, published as WO85/04390 on Oct. 10, 1985.

[30] Foreign Application Priority Data

Apr. 2, 1984 [HU] Hungary ............................. 1319/84

[51] Int. Cl.⁴ ............................. C05F 3/00; C02F 3/08
[52] U.S. Cl. ....................................... 71/13; 210/616; 210/618; 210/631; 210/903; 210/673
[58] Field of Search ........................... 210/616–618, 210/150, 151, 903, 673, 676, 681, 631; 71/10–13

[56] References Cited

U.S. PATENT DOCUMENTS

| | | | |
|---|---|---|---|
| 3,617,540 | 11/1971 | Bishop et al. | 210/903 |
| 4,098,690 | 7/1978 | Semmens | 210/903 |
| 4,522,727 | 6/1985 | Weber | 210/903 |

FOREIGN PATENT DOCUMENTS

| | | | |
|---|---|---|---|
| 51-109155 | 9/1976 | Japan | 210/903 |
| 53-27261 | 3/1978 | Japan | 210/616 |
| 53-85947 | 7/1978 | Japan | 210/903 |
| 53-105054 | 9/1978 | Japan | 210/617 |

*Primary Examiner*—Benoit Castel
*Attorney, Agent, or Firm*—Schweitzer & Cornman

[57] ABSTRACT

Contaminated water is contacted with an agent which contains salts or cations of mono-, di-, or trivalent metals in a maximum amount of 50 masspercent and rock granules containing at least 25 masspercent zeolite, preferably clinoptilolite and/or mordenite. The amount of metal salts respectively cations present in the parent zeolitic rock can be increased according to necessity by ion-exchange, adsorption and/or impregnation, i.e. by combination of these processes following eventual dehydration. The agent obtained is homogenized. The exhausted bed can be regenerated biologically or with aqueous solution of a potassium salt.

5 Claims, 1 Drawing Sheet

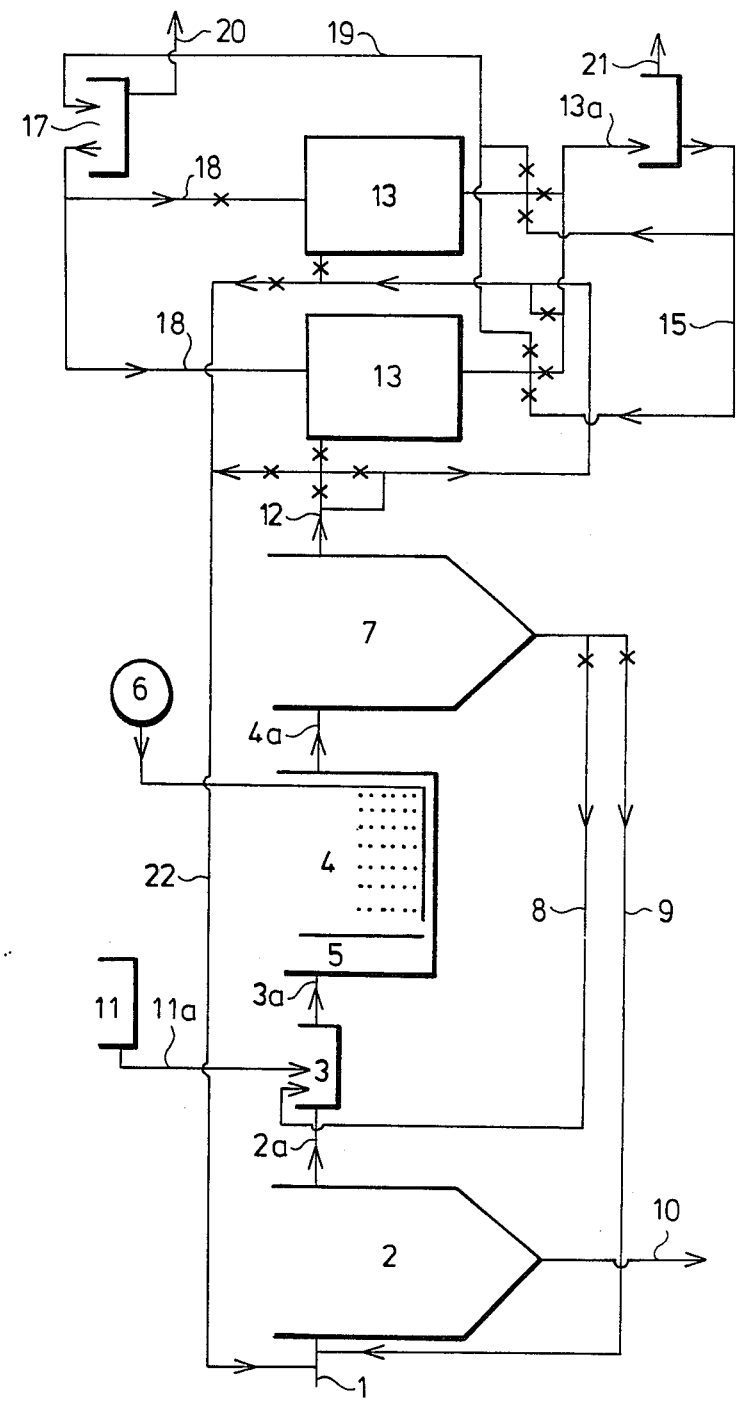

PROCESS FOR PREPARING AN AGRICULTURAL FERTILIZER FROM SEWAGE

This is a continuing application of application Ser. No. 800,564, filed Nov. 20, 1985, now abandoned, which is a continuing application of No. PCT/HU85/00021, filed on Apr. 1, 1985, now abandoned.

TECHNICAL FIELD

This invention relates to a process for removal of suspended materials, biogenetic nutrients and dissolved metal compounds from e.g. water or sewage, contaminated with organic and/or inorganic substances, as well as to an apparatus for carrying out the process.

BACKGROUND ART

As used herein "biogenetic nutrients containing nitrogen and phosphorus compounds" means those compounds useful for cultivated plants, i.e. fertilizers.

Due to industrialization, urbanization and intensification of agriculture, contamination of waters is an ever increasing global problem.

In general, methods of sewage treatment and purification which have been recently used do not result in complete purification since the majority of the dissolved and colloidal contaminants and a considerable part of suspended solid particles are not removed.

The limitations of money available for investment and steadily increasing energy costs do not permit development of technologies for a perfect purification.

Water considered as purified usually contains a considerable amount of dissolved material which consists generally of nitrogen and phosphorus compounds. These are the most important nutrients for plants, therefore their recovery for a direct application in agriculture improves the economics of sewage purification.

In addition, there are waste waters mainly of industrial origin where the substances dissolved therein consist predominately of heavy metal salts. In general, these are toxic for the biosphere, but their recovery by conventional processes is too expensive. Sewage-sludge is produced in the sewage treatment. At present, however, there is much controversy as to the advisability of utilization of such sewage-sludges and the conditions of such use.

Today it is well known that all organic substances in sewage-sludge are valuable humus forming materials, but opinions differ as to the value of sewage-sludge as a nutrient. The most significant reservations concerning the application of sewage-sludge in agriculture involve the heavy metal content and the hygiene of its use because of the infections sewage-sludges can cause. Although all over the world research programs are focused on the incorporation of heavy metals in plants and therethrough into the animal-human organism chain, the matter has not yet been resolved. Recently, in some countries provisional rules came into existence which prescribe the maximum acceptable loading of soils for each heavy metal.

The three main well known processes for the treatment of sewage contaminated with organic substances are as follows:
mechanical;
biological; and
physico-chemical.

The so-called mechanical separation-processes are important steps in water and sewage treatment technologies. About 30% to 40% purification can be attained when solid suspensions are separated mechanically by specific weight differences.

The aim of secondary purification or biological means is to remove colloids and dissolved organic substances. The removal of organic substances by microorganisms results in the formation of inorganic substances such as dissolved nitrogen and phosphorus salts.

As for sludge-loading, the following sewage treatment systems can be distinguished:
(a). partial biological treatment;
(b). complete biological treatment;
(c). complete biological treatment with nitrification; and
(d). complete biological treatment with sludge-stabilization the so-called total oxidation-process.

For the above systems, one of the main differences is the time of aeration which is 0.75–1.5 hours in the case of system (a); 3.00 hours in the case of system (b); 8.00 hours in the case of system (c); and 24.00 hours in the case of system (d).

The energy needed for aeration increases with time, whereas the efficiency of oxygen consumption decreases with time due to the progress of oxidation. Since aeration requires the most energy in sewage treatment plants, the extent of oxidation should thus be considered from economic aspects.

Physico-chemical purification processes are used if dispersed solids cannot be settled and mechanically separated as, e.g. colloid suspensions (particle size 0.01–1.0 $\mu$m), or if the biological decomposition of the substances is too expensive or even impossible. Coagulation, precipitation and filtration are the main physico-chemical processes in connection with this invention. Specific costs of physico-chemical processes are relatively high owing, among others, to the expensive reagents required.

Physico-chemical processes are mostly used in the third treatment step in order to remove material remaining and inorganic nitrogen and phosphorus compounds which were partly formed during the previous biological treatment. In this way, the water discharged from the sewage treatment plant is of good quality, i.e. it can be reused either in industrial processes, or can simply be discarded without causing any eutrophization in surface waters.

In general, the third treatment step follows the complete biological purification and the accompanying nitrification. It increases, however, considerably both investment and operation costs.

The biological denitrification technologies involve nitrogen removal from the sewage after it has been oxidized previously to nitrate from ammonium with high energy comsumption by using an expensive and complicated process.

A usual way for denitrification is with ion-exchange technology using synthetic resin bases. Due to the special features of this process it is mainly used in drinking water purification.

Other processes, e.g. reversed osmosis, are even more expensive, accordingly, their practical use is rather limited.

Soluble inorganic phosphorus compounds, mostly ortho phosphates, are removed in the third treatment step by chemical precipitation using aluminum or iron compounds.

Iron and aluminum salts, lime, polyelectrolytes and combinations thereof are used for removing suspended materials. Such methods are dealt with in the "Water Treatment Handbook" of Degremont, 5th Edition Halsbed Press Book, Jon Wiley and Sons, New York 1979(I); in "Gewässerschutz, Wasser, Abwasser" Vol. 17. Aachen, 1975, and in "Anwendung von Fällungsverfahren zur Verbesserung der Leistungsfähigkeit biologischer Anlagen" Institut für Bauingenieurwesen V. Technische Universität, München, 1978.

The above chemical treatments result in about 20–90% metal removal by formation of insoluble hydroxides. In the usual pH range between 6 and 8, the ammonium content remains unchanged.

According to Hungary Pat. No. 175,558, approximately 90% of the orthophosphate present can be removed by adding 200–300 mg aluminum sulfate to one liter of waste water, whereas the ammonium content remains unchanged.

A process is described in Hungary Pat. No. 180,613 where COD is decreased by 30–40% with charcoal treatment, but neither the amount of the suspended material, nor the ammonium content are changed. The removal of ammonium is usually carried out by nitrification followed by denitrification in order to avoid the undesired accumulation of $NO_3^-$ in the effluent.

Summarizing, the above processes have the following disadvantages:

The nitrification can be performed by a total biological oxidation which requires great investment and operating costs. Similar difficulties arise with denitrification. Moreover, the denitrification is very sensitive to temperature and the concentration of oxygen absorbed in water.

Moreover, medium should be added to the dentrification-biomass which further increases the expenses and complicates the operation.

The reagents or additives used in waste water treatments exert rather specific effects. In addition, they are of relatively high price, e.g. charcoal, and may bring about corrosion, e.g. aluminum sulfate.

The main objects of the present invention are:

(a) As a result of the purification process, water should be produced which can be reused or which must not exert impermissible detrimental effects on surface or underground water;

(b) Based on advanced research results in agronomy, biogenetic nutrients for agriculture should be produced by the purification process making it possible to utilize harmless sewage-sludge in agriculture.

A further object lies in changing the role of sewage treatment plants, which are now restricted only to the removal of impurities, by making it possible to use by-products produced therein which have a positive economic impact.

In order to achieve the objects outlined above, it is necessary to (a) carry out an intense purification of contaminated water, which includes removal and/or recovery of solid, colloidal and dissolved materials by precipitating the gross of suspension and of nitrogen, phosphorus and metal contaminants in fewer technological steps than in conventional processes. This reduces the costs of investment and operation; and (b) intensify simply existing sewage purification plants.

To achieve the above objects, this invention provides a process which offers solutions to meet the special demands and opens new economic aspects.

BRIEF DESCRIPTION OF THE DRAWINGS

The drawing is a schematic representation of the mode of operation and arrangement of a preferred embodiment of the invention.

DESCRIPTION OF THE INVENTION

This invention is based on the recognition that some particular minerals, especially certain types of natural zeolites, exert physico-chemical effects on sewage water which improves fundamentally both the efficiency of purification and economy of the process.

We found that the aforementioned effects can be achieved by using appropriate fractions of crushed and physico-chemically treated rocks containing natural zerolites, e.g. clinoptilolite or mordenite. These materials coagulate partly on the basis of selective ion-exchange and adsorption and as an additional effect perform chemical precipitation by partly removing ammonium and heavy metal ions by selective ion-exchange and adsorption. Further, they filter suspended material.

In rocks which were used in our experiments, the zeolites, i.e. clinoptilolite and mordenite, were present in a microcrystalline form. The microcrystallites are of 0.1 to 10 $\mu$m in size. Besides the zeolites, the rocks contain quartz, different clay minerals in some mass as well as amorphous volcanic glass.

It is well known that zeolites are cation-exchange inorganic polymers, since their lattice is formed by a rigid polyanionic alumino-silicate framework.

Besides the zeolitic pores of embedded clinoptilolite or mordenite, the rock contains micropores between the heterodisperse mineral constituents. In the raw material Na, Mg and Ca cations are bound to the anion lattice and can be exchanged for other cations to a lesser or greater extent.

We found that the raw material of appropriate grain size may exert, even in its original form, i.e. without any preliminary ion exchange, a precipitating effect on suspended materials and colloids in sewage. In addition, due to its ion-exchange property, it brings about the removal of ammonium and heavy metal ions (lead, nickel, copper, cadmium, mercury, silver and the like). The selective ion-exchange effect is well known in the literature of zeolites and of clinoptilolite. These expectations have been confirmed by our experiments. Moreover, we found experimentally that zeolites may be used for orthophosphate precipitation if they contain cations which can be exchanged for $NH_4^+$ and form insoluble orthophosphate precipitates. Accordingly, a basic premise of the invention is based on the discovery that by continuous feeding of zeolite at an adequate rate in an appropriate way, and in a proper grain size, simultaneously with floccule formation produced by coagulation and after the formation of floccules the adsorptive capacity of the sludge containing zeolite can be well utilized for the removal of suspended material as well as of colloidal particles, and with an increasing efficiency for the removal of ammonium and heavy metal ions by ion-exchange.

In addition, it becomes possible to enhance the precipitation of orthophosphates by preliminary modification of natural zeolites and to remove reliably the phosphate precipitate thus formed.

The process according to the invention unites all the advantages of preliminary and simultaneous phosphate precipitation, whereby harmful phenomenon can be avoided when micro-floccules formed in the activated sludge aeration basin are discharged with purified sewage from the post sedimentation basin, thus increasing suspended material content thereof.

Substances promoting removal of phosphates can be introduced into the zeolite in several ways, e.g. by ion-exchange, adsorption, impregnation or by a combination thereof. Depending on the requirements of a given sewage treatment, these processes can be combined to obtain the most conveniently modified zeolite.

After crushing the sieving, i.e. after a mere mechanical treatment, the zeolite-containing rock in its natural form exerts, in addition to coagulation, further economically important effects, such as:
 (a) the sedimentation efficiency will be increased, resulting in an intensified operation of secondary settling apparatus and in a considerable reduction of the suspended material content of purified water;
 (b) the ammonium and heavy metal ion content will be reduced; and
 (c) the phosphorus content of water can be considerably reduced by this modified additive.

Moreover, the material with the complex effect affords an extended application of the invention, including further advantages in comparison with the known additives having physico-chemical effects, i.e.;
 (a) as a result of zeolite feeding, biological activity of the activated sludge system is increased due to the increased specific surface area where decomposing bacteria settle and thus their concentration by volume is greater; and
 (b) the sludge thus formed is of better quality than any obtained by known processes since
  (i) it can easily be dehydrated; and
  (ii) a manure can be obtained for agriculture uses, thus improving the nutritive value and water holding capacity of the soil, simultaneously reducing supposed dangers of application of sewage-sludges.

Since clinoptilolite has a well known ion-exchange selectivity for ammonium, significant ammonium removal can be attained, and the formed ammonium clinoptilolite can be used in agriculture; the investment and energy costs of the secondary purification stage as well as of the third stage, i.e. denitrification, can thus be reduced.

In addition to the increased zerolitic sedimentation effect, as noted above, a further benefit is achieved by the selective ion exchange, i.e. the purified water is free of suspended material since it contains only dissolved substances.

Suspended material of minute amounts remaining after the previous processes steps can be removed from the purified water in accordance with this invention by the additional filtering effect of an ammonium ion exchange zeolite bed.

Accordingly, a further main feature of the process of this invention is based on the discovery that biological treatment should be performed without nitrification, but only to the point of complete biological oxidation of contaminating carbon compounds. Thereafter the water containing dissolved ammonium is led through a filter bed filled with suitably prepared clinoptilolite on which ammonium is bound by ion exchange. Nitrification and denitrification operations can thus be omitted, and the costs of deammoniation is appreciably less than that of one of these two steps.

Ammonium and heavy metal ion exchange properties as well as the utilization of these properties of natural and synthetic zerolites are well known in technical and patent literature. However, no solution is known for enhancing the efficiency and improving the economy of biological sewage treatment by using natural zerolities or their modified forms. Thus, German DE-AS No. 2,531,338 suggests zeolites phillipsite and gismondite for ion-exchange fillings, the regeneration of which can be carried out with a salt solution heated to 80° C. No details of ammonium ion-exchange for sewage purification are discussed, and no reference is given for the treatment of the eluate formed during regeneration of the zeolite bed.

United States Pat. No. 3,723,303 describes a process where ammonium is removed with synthetic zeolite F from aqueous solutions which contain alkali or alkaline earth metals. As an aqueous solution in particular, secondary effluent of municipal sewage purification plants is treated. The United States Patent description contains a detailed description of the technology. According to the illustrative embodiment, the municipal sewage is filtered, treated with activated sludge under aerobic conditions and with a coagulating agent, e.g. aluminum sulfate. From a fraction of the effluent, ammonium is removed by ion exchange in a bed filled with zeolite F. The zeolite is regenerated with a saturated lime solution containing sodium and calcium chlorides. By scrubbing with air, the solution of pH 12 is decontaminated.

A further advantage of the present invention is that ammonium ion selective clinoptilolite zeolite is regenerated with reagents which are a nutrient for plants. The excess of regenerating agent in a high concentration $NH_4$-solution results in a valuable fertilizer. This can be attained by regeneration of the clinoptilolite zeolite with an aqueous potassium salt solution. The solution obtained after the regeneration steps contains ammonium and potassium, both being useful vegetable nutrients. The solution can be directly utilized in agriculture.

Very important advantages of the process according to this invention are that treated water which has been denitrified by ion exchange does not carry eutrophicating materials or any impurities hazardous to the environment and the regeneration of the exhausted ion-exchanger does not result in air pollution. The potassium salt solution used for regeneration can be deammoniated by blowing with air and by increasing its pH value. After absorbing the gaseous ammonia in a phosphoric acid solution, a liquid fertilizer with a complex effect is formed. In this case, the regenerating salt solution can be repeatedly used only by supplying potassium losses.

Ammonium binding capacity of exhausted zeolites can be restored also by biological decomposition of the ammonium ions bound to the zeolite, i.e. by means of biological regeneration.

Biological regeneration is based on the fact that in the presence of oxygen certain bacteria, e.g. Aerobacter aerogenes, are able to directly assimilate ammonia and simultaneously other well known ammonia-decompositions take place, namely, nitrification and denitrification. Nitrosomonas which use ammonium salts as sole energy sources oxidizes them to nitrite ions, whereas Nitrobacters oxidize the nitrites produced by Nitrosomonas to nitrate, thus supplying their energy demand. Thereafter, in the absence of oxygen, nitrate is reduced to elemental nitrogen by the denitrifying bacteria. This sequence of biological processes results in removal of ammonium bound to the zeolite.

By proper manipulations, e.g. by aeration, by inoculation, by ensuring a minute concentration level of phosphorus, by removal of reaction products, etc., the period of biological regeneration can be considerably shortened.

As a result of biological regeneration, ammonium ions are replaced by protons, and the formed H-zeolite has an outstanding ionexchange capacity for ammonium.

The clinoptilolite filter bed technology can be used alone from removing ammonium of high concentration from industrial waste waters prior to or without biological treatment.

An ion-exchange bed filled with clinoptilolite properly pretreated can be well utilized for the removal of a part of heavy metal ions contained in sewage, e.g. lead, nickel, copper, cadmium, mercury, silver, and the like, and the resulting effluent is ecologically harmless.

According to this invention, the complex requirements are solved so that contaminated water is brought into contact with an agent which contains maximum 50 mass % of salts of mono-, bi- or tri-valent metals, i.e. the cations thereof, and minimum 50 mass % of a granulated rock containing at least 25 mass % zeolite, preferably in the form of clinoptilolite and/or mordenite.

The amount of metal salts or more specifically, the amount of cations, in the agent is determined by the desired effect. The amount of these constituents in the parent zeolite-containing rock may be sufficient to attain an increased settling to remove fractions of phosphate, ammonium ions and heavy metal components.

Preferably, the applied agent has a definite content of metal salts, i.e. metal cations, where the metal content in said agent is increased in the untreated or dehydrated zeolite consisting of granules by ion-exchange, adsorption or impregnation, or by a combination of these processes so that the material thus obtained is homogenized.

As an example, the chemical compositions (in mass %) of typical clinoptilolite and mordenite containing samples in Hungary are as follows:

| Component | Rock containing clinoptilolite | Rock containing mordenite |
| --- | --- | --- |
| $SiO_2$ | 68.35 | 70.60 |
| $Al_2O_3$ | 11.94 | 12.43 |
| $Fe_2O_3$ | 1.00 | 0.64 |
| $Na_2O$ | 0.32 | 1.46 |
| $K_2O$ | 4.15 | 4.89 |
| MgO | 0.21 | 0.04 |
| CaO | 1.64 | 1.80 |
| Loss on ignition ($H_2O$) | 12.22 | 8.57 |

For removal of a fraction of phosphate, ammonium and heavy metals, as well as to enhance settling during the mechanical and/or biological sewage treatments, the waste water and/or the recirculation sludge from the secondary settling unit should be contacted with an agent of a grain size less than 200 $\mu$m.

Further advantages can be achieved if biological sewage treatment is carried out without nitrification to the complete oxidation of carbon compounds, and the water, after secondary settling, is led through one or more zeolite beds connected in series or parallel, where the ammonium is completely removed. The grain size of zeolite should be between 1 and 10 mm, preferably between 2 and 5 mm.

It is advantageous to regenerate the exhausted zeolite with aqueous solution of a potassium salt. The solution, after regeneration, is enriched in ammonium and can be directly used for plant nutrition, or can be mixed with properly pretreated primary and excess sludge mixture discharged from the primary settling basin, resulting in a high quality fertilizer.

Depending on the demand of plant nutrition, the used potassium salt solution containing ammonium can be deammoniated by aerating at higher pH values. The potassium salt solution is thus regenerated and the evolved ammonia can be absorbed in phosphoric acid solution resulting in a liquid fertilizer of high nitrogen and phosphorus content.

In a preferred mode of the process of this invention, the exhausted zeolite can also be regenerated, i.e. deammoniated biologically.

The process of this invention utilizes several advantageous properties of the zeolites employed. Thus, the efficiency of known purification processes can be increased and further utilization of the separated contaminants which are mostly bound by ion-exchange becomes possible. Compared to known processes, investment and operation costs are considerably reduced when using the process of this invention. Water treated by the process of this invention is sufficiently purified by removal of contaminants that it can be used again or can be discharged into natural water systems without any hazardous affects on the environment.

The properties of dissolved materials and of sludge formed during the treatment are changed to the extent that useful plant nutrients can be gained, whereas toxic heavy metal ions are fixed in a water-insoluble state inaccessible for the plants.

The process of this invention can be used for treatment of all types of waste waters formed as municipal sewage, industrial effluent or thin manure. The waste waters may be purified with mechanical, biological and physico-chemical treatments.

In the apparatus according to this invention, the sewage is fed into a primary settling tank from which a pipe leads to a mixing tank, into which the agent from a preparation container and the recirculation sludge from the secondary settling tank is introduced. Mixing tanks are linked to the adsorption zone which has communication with an aeration basin provided with oxygen introduction. From there a pipe leads to a secondary settling tank from which a fraction of sludge is recirculated through a pipeline to the mixing tank. Excess sludge is fed back into the primary settling tank from where the sludge is removed. The treated water leaves the secondary settling tank through an outlet.

In a preferred embodiment of this invention, the outlet of the secondary settling tank leads to one or more zeolite beds. If there are more than one, they are connected in series or parallel. Subsequently, each of the top and the bottom of the zeolite bed(s) are connected by pipes with a container of the regenerating solution. The resulting discharge is led into a buffer tank provided with an outlet pipe and a reflush pipe to zeolite beds. The flush leaves the zeolite beds through a duct into the primary settling tank. The resulting aqueous solution of potassium salt enriched with ammonium can be discharged from the container through another pipe.

Mode for Carrying Out The Invention Process

The structural arrangement and operation scheme of a sewage treatment plant of 10,000 m$^3$/d capacity is shown in the Figure. The input is urban sewage, the contaminants of which are:

300 g BOD/m$^3$ and 50 g NH$_4^+$/m$^3$.

The sewage arriving through an inlet pipe 1 is passed through a primary settling tank 2 with an effective volume of 900 m$^3$, through an outlet pipe 2a into a mixing tank 3 of a volume of 50 m$^3$, through pipe 3a into an adsorption zone 5 with a useful volume of 1120 m$^3$ which zone 5 is separated from an aeration basin 4 by a divider wall and finally through a connecting pipe 4a into a settling tank 7 with an effective volume of 900 m$^3$.

The residence time of the sewage in the aeration basin 4 is 2.7 hours, and 3150 kg O$_2$/d is introduced by an oxygen feeding unit 6. In the secondary settling tank 7 cleaned sewage and activated sludge are separated. A fraction of the precipitated sludge is recirculated into the mixing tank 3 through the connecting pipeline 8, while the excess of sludge is led through pipeline 9 to the primary settling tank 2, wherefrom it is removed with the primary sludge through an outline pipe 10.

Appropriately prepared zeolite of suitable grain size is fed through a connecting pipe 11a into the mixing tank 3 from a preparation container 11, as a consequence of which in the water leaving the secondary settling tank 7 through an outlet 12 suspended material such as ammonium, phosphorus, BOD$_5$, COD, as well as heavy metal contents are considerably decreased.

Pretreated sewage leaving the secondary settling tank 7 through outlet 12 is led through one of the zeolite beds 13 working alternately. The beds 13 are filled with specially pre-treated material of proper grain size and of high clinoptilolite and/or mordenite content. The surface amounts to 2×130 m$^2$ while the volume is 400 m$^3$.

The rest of suspended material and of ammonium is removed into the zeolite bed 13 and the treated water then flows through a buffer tank and an outlet pipe 21 into a recipient or a place of utilization.

The zeolite beds 13 are flushed with purified water from buffer tank through a connecting pipeline 15. Sludge floccules are removed from the resulting upper layers and the flush-water with the remaining sludge is fed back through flush-water duct 22 to the primary settling tank 2. After settling, the sludge is removed from the primary settling tank 2 through the outlet pipe 10.

The now exhausted zeolite beds 13 are flushed with an aqueous solution of potassium salt from a container 17 through an outlet pipe 18. In such a manner, the zeolites ammonium-removing ability can be restored. Regenerating solution can be fed back to the container 17 through a connecting pipeline 19 from the buffer tank and can be repeatedly used. During regeneration, ammonium is exchanged for potassium in the zeolite and the aqueous solution of potassium-salt enriched with ammonium is discharged through discharge pipe 20 and is suitable to be used for plant nutrition.

On comparing the advantages of the process of this invention with known and presently used sewage treatments, the following conclusions are reached:

- appreciably less construction and installation is required for the same treatment capacity;
- the operation needs substantially less energy;
- on accomplishing the tertiary treatment, there is considerable savings in both the investment expenses and operation cost as well as for the first and second stages;
- on attaching the process of this invention to existing complete biological sewage treatments, which performs nitrification or total oxidation, the capacity of existing plants can be essentially increased;
- environment contaminating substances heretofore considered as harmful can be recovered as useful materials for agriculture without interfering with ecological interests;
- by denitrification, water is produced of a purity which enables its industrial utilization without any further treatment;
- as a result of treatment, the sludge can more easily be dehydrated, even the stabilizing processes may be omitted;
- the sludge formed can be utilized in agriculture, since; it increases the organic matter of soils, it increases the nutrient content of soils, and it improves the water-economy of the soil in the root-zone;
- nitrogen and phosphorus nutrients are retarded;
- as a result of the aforementioned effects fertilizer requirements of the soils will be less;
- as a result of the aforementioned effects, elution of nitrogen and phosphorus nutrients can be diminished, consequently nitrogen contamination of underground waters and eutrophication of recipients can be avoided;
- acidification of soils owing to the intense use of fertilizers can be suppressed or even avoided; and
- fixed heavy metals cannot exert hazardous effects.

On taking into account all these advantages by utilization of the process of this invention, the permanent and wide ranging deterioration of water quality can be slowed down, stopped or even reversed.

We claim:

1. A non-biological process for forming an agriculturally acceptable fertilizer by removal of suspended solids biogenetic nutrients and dissolved metal compounds from water contaminated with organic and/or inorganic substances, comprising the steps of
    (a) contacting the contaminated water with an agent which contains a maximum quantity of 50 mass percent of salts of mono-, bi- or trivalent metal cations and a minimum quantity of 50 mass percent rock granules which contain at least 25 mass percent of a zeolite having ion-exchange selectivity for ammonium, to remove most of the suspended solids, phosphates, organic compounds, metal ions and a fraction of ammonium ions thereon;
    (b) binding residual ammonium ions onto said zeolite by passing said treated water through a bed thereof;
    (c) regenerating the ammonium binding capacity of said zeolite bed, after said capacity is exhausted, with a regenerating aqueous potassium salt solution;
    (d) enriching the regenerating solution with ammonium during regeneration of said zeolite, expelling ammonia gas from the regenerating solution, and absorbing it in phosphoric acid;
    (e) mixing said enriched solution with agriculturally acceptable fertilizer additives and with pretreated primary sludge and excess sludge; and
    (f) homogenizing the mixture of step (e) to produce an organic agriculturally acceptable fertilizer composition.

2. Process of claim 1 wherein the zeolite is clinoptilolite or mordenite.

3. Process as claimed in claim 1, wherein said agent has a definite content of metal as metal cations, and the metal content in said agent is increased in said zeolite containing granules by treating them with ion-exchange, adsorption or impregnation or by a combination of these processes, then homogenizing the material thus obtained.

4. Process as claimed in claim 1, comprising enriching, during regeneration of the zeolite bed, the resulting regenerating solution with ammonium and expelling the ammonia gas from the regenerating solution and absorbing it in phosphoric acid.

5. A process for preparation of an agricultural fertilizer composition by removal of suspended solids, biogenetic nutrients and dissolved metal compounds from water and sewage contaminated with organic and/or inorganic substances, comprising the steps of;
   (a) flowing said water and sewage into a primary settling tank wherein sludge settles out;
   (b) conducting the sludge through a sludge outlet for discharging from said primary settling tank;
   (c) conducting said settled water and sewage from said settling tank to a mixing tank;
   (d) adding to said mixing tank an agent which contains a maximum quantity of 50 mass percent of salts of mono-, bi- or trivalent metal cations, a minimum quality of 50 mass percent of rock granules which contain at least 25 mass percent of a zeolite having an ion exchange selectivity for ammonium;
   (e) mixing sludge, said settled water and sewage and zeolite-containing agent to remove most of the solids suspended therein, phosphate, organic compounds, metal ions and a fraction of ammonium ions thereon;
   (f) conducting water and sewage from the mixing tank to an aeration basin and adding oxygen therein;
   (g) conducting the oxygen-treated water and sewage to a secondary settling tank were treated water and sewage and any sludge therein separate;
   (h) discharging the treated water through a discharge outlet; and
   (i) increasing the biological activity of settled sludge from said contaminated water and sewage by contacting with a zeolite containing agent of grain size less than 200 $\mu$m to form an agricultural fertilizer composition.

* * * * *